(12) United States Patent
Wang et al.

(10) Patent No.: US 12,546,962 B2
(45) Date of Patent: Feb. 10, 2026

(54) OPTO-ELECTRONIC ADAPTER AND COMMUNICATION SYSTEM

(71) Applicant: HUAWEI TECHNOLOGIES CO., LTD., Guangdong (CN)

(72) Inventors: Zhongxing Wang, Wuhan (CN); Bo Yan, Shenzhen (CN); Fei Yu, Wuhan (CN); Le Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 18/455,892

(22) Filed: Aug. 25, 2023

(65) Prior Publication Data
US 2023/0400650 A1    Dec. 14, 2023

Related U.S. Application Data

(63) Continuation of application No. PCT/CN2022/077615, filed on Feb. 24, 2022.

(30) Foreign Application Priority Data

Feb. 26, 2021    (CN) .......................... 202110220169.8

(51) Int. Cl.
G02B 6/42    (2006.01)
G02B 6/38    (2006.01)

(52) U.S. Cl.
CPC ......... *G02B 6/4293* (2013.01); *G02B 6/3825* (2013.01); *G02B 6/3849* (2013.01)

(58) Field of Classification Search
CPC .. G02B 6/4293; G02B 6/3825; G02B 6/3849; G02B 6/3817; G02B 6/3807; Y02E 10/50; H01R 12/71
See application file for complete search history.

(56) References Cited

U.S. PATENT DOCUMENTS 10,094,994 B2 * 10/2018 Leigh ................... G02B 6/3897
2012/0020629 A1    1/2012 Shiratori et al.
2015/0016783 A1    1/2015 Leigh et al.

FOREIGN PATENT DOCUMENTS

CN    1914532 A    2/2007
CN    108390197 A    8/2018
(Continued)

OTHER PUBLICATIONS

Office Action dated Jul. 27, 2023, issued for Chinese Application No. 202280002894.0 (11 pages).
(Continued)

*Primary Examiner* — John Bedtelyon

(57) ABSTRACT

An optical connector has a first connection end configured to fit with a peer adapter. The electrical connector has a second connection end configured to fit with the peer adapter. The first connection end and the second connection end have a same opening direction. In addition, the first connection end may slide along a plugging direction of the peer adapter relative to the second connection end. The first connection end is configured to be connected to the peer adapter before the second connection end. The optical connector is connected to the peer adapter before the electrical connector. This ensures that a channel for transmitting an optical signal is communicated before a channel for transmitting an electrical signal is communicated, thereby avoiding fiber burning and improving security and reliability of the opto-electronic adapter during use.

20 Claims, 11 Drawing Sheets

(56) References Cited

FOREIGN PATENT DOCUMENTS

| | | |
|---|---|---|
| CN | 110646897 A | 1/2020 |
| CN | 111106469 A | 5/2020 |
| CN | 113109905 B | 4/2023 |
| TW | I427870 B | 2/2014 |

OTHER PUBLICATIONS

Extended European Search Report dated Jun. 11, 2024, issued for European Application No. 22758910.8 (7 pages).

* cited by examiner

OPTO-ELECTRONIC ADAPTER AND COMMUNICATION SYSTEM

CROSS-REFERENCE TO RELATED APPLICATION

This application is a continuation of International Application No. PCT/CN2022/077615, filed on Feb. 24, 2022, which claims priority to Chinese Patent Application No. 202110220169.8, filed on Feb. 26, 2021. The disclosures of the aforementioned applications are hereby incorporated by reference in their entireties.

TECHNICAL FIELD

This disclosure relates to the field of opto-electronic technologies, and in particular, to an opto-electronic adapter and a communication system.

BACKGROUND

In recent years, applications such as a data center, 5G midhaul, and an access network have increasingly strong requirements for low-cost and large-capacity optical interconnection. A multi-channel transmitter and receiver based on silicon photonics (SiPh) have been widely considered as one of main solutions for optical interconnection. With continuous efforts in the industry, remarkable progress has been made in terms of silicon photonics (SiPh) technologies. A biggest challenge faced by a current SiPh transceiver is a lack of a monolithic integrated light source. With continuous exploration in the industry, several solutions for integrating a laser into an SiPh transceiver emerge, such as flip chip bonding, die or wafer bonding, and III-V growth on a silicon substrate.

With development of a high-power, multi-channel, and pluggable external light source module, when the external light source module is connected to a circuit board of a data center, an optical connector is required to implement optical signal transmission. In addition, an electrical connector is required to implement electrical signal transmission. However, in a process of connecting the external light source module to the circuit board, an optical fiber in the optical connector is prone to be burnt, causing damage to the optical connector.

SUMMARY

This disclosure provides an opto-electronic adapter and a communication system, to improve security when the opto-electronic adapter is connected to a peer adapter in a pluggable manner.

According to a first aspect, an opto-electronic adapter is provided, and is configured to be connected to a peer adapter in a pluggable manner. When the opto-electronic adapter is connected to the peer adapter in a pluggable manner, the peer adapter is plugged into the opto-electronic adapter along a first direction. The opto-electronic adapter includes an optical connector and an electrical connector that are stacked. The optical connector has a first connection end configured to fit with the peer adapter, and the electrical connector has a second connection end configured to fit with the peer adapter. The first connection end and the second connection end have a same opening direction, so that when connected to the peer adapter, the first connection end and the second connection end each may be connected to the peer adapter. In addition, when the first connection end and the second connection end are disposed, the first connection end may slide along the first direction relative to the second connection end. The first connection end is configured to be connected to the peer adapter before the second connection end. In the foregoing technical solution, the optical connector is connected to the peer adapter before the electrical connector. This ensures that a channel for transmitting an optical signal is communicated before a channel for transmitting an electrical signal is communicated, thereby avoiding fiber burning and improving security and reliability of the opto-electronic adapter during use.

In a specific implementable solution, the first connection end is further configured to be disconnected from the peer adapter after the second connection end. The electrical signal is first separated, and then the optical signal is separated, thereby improving security of the opto-electronic adapter in use.

In a specific implementable solution, when the first connection end is connected to the peer adapter, a sliding distance of the first connection end relative to the second connection end is d1, a fitting distance of the second connection end to be plugged into the peer adapter is d2, and d1 and d2 satisfy d1>d2. The sliding distance of the first connection end relative to the second connection end is greater than a distance at which the peer adapter is plugged into the second connection end. This ensures that the first connection end is connected to the peer adapter before the second connection end.

In a specific implementable solution, the opto-electronic adapter further includes a housing, and the optical connector and the electrical connector are located in the housing. The first connection end may slide relative to the housing, and the second connection end is fixed relative to the housing. The housing has a first end configured to be connected to the peer adapter in a pluggable manner. When not connected to the peer adapter, the first connection end is closer to the first end compared with the second connection end. When connected to the peer adapter, the second connection end is closer to the first end compared with the first connection end. This ensures that the first connection end is connected to the peer adapter before the second connection end.

In a specific implementable solution, the electrical connector is fixedly connected to the housing. The electrical connector is fixedly connected to the housing, so that the second connection end is fixed relative to the housing.

In a specific implementable solution, the optical connector includes a ferrule, a first elastic component, and a ferrule holder that are arranged along the first direction. One end that is of the ferrule and that is away from the ferrule holder is the first connection end. The ferrule holder is fixedly connected to the housing. The ferrule is slidably connected to the ferrule holder and may slide along the first direction. The first elastic component is configured to push the ferrule to slide along a direction away from the ferrule holder. The ferrule and the ferrule holder slide relative to each other. This ensures that the optical connector may be connected to the peer adapter before the electrical connector, and disconnected from the peer adapter after the electrical connector.

In a specific implementable solution, the first elastic component is a compression spring or a spring plate. Different types of elastic components provide a driving force for the ferrule to slide.

In a specific implementable solution, a limiting protrusion configured to limit a sliding distance of the ferrule along a direction away from the ferrule holder is disposed in the housing. A distance between the ferrule and the ferrule holder is limited by using the limiting protrusion.

In a specific implementable solution, the opto-electronic adapter further includes a dust-proof component configured to shield the first connection end. The dust-proof component is rotatably connected to the housing, and avoids the peer adapter when the peer adapter is plugged into the housing. The dust-proof component improves protection for the first connection end, reduces dust on an optical fiber in the optical connector, and reduces a probability of fiber burning.

In a specific implementable solution, a guide structure configured to guide the peer adapter to fit with and be plugged into the housing is disposed in the housing. The guide structure is located on a side that is of the dust-proof component and that is away from the first connection end. An effect of fitting between the optical adapter and the peer adapter is improved by using the guide structure.

In a specific implementable solution, the dust-proof component includes a first dust-proof plate and a second dust-proof plate. When the first dust-proof plate and the second dust-proof plate rotate to a first specified position, the first dust-proof plate and the second dust-proof plate shield the first connection end. When the first dust-proof plate and the second dust-proof plate rotate to a second specified position, the first dust-proof plate and the second dust-proof plate avoid the peer adapter. The first connection end is protected by the disposed side-by-side dust-proof component.

In a specific implementable solution, the dust-proof component further includes a second elastic component. The second elastic component is configured to push the first dust-proof plate and the second dust-proof plate to press against the guide structure. The second elastic component pushes the first dust-proof plate and the second dust-proof plate to be closed, thereby improving a dust-proof effect.

In a specific implementable solution, when the first dust-proof plate and the second dust-proof plate rotate to the first specified position, the first dust-proof plate and the second dust-proof plate are of a V-shaped structure, and an opening direction of the V-shaped structure is away from the first connection end. This facilitates the peer adapter to push the first dust-proof plate and the second dust-proof plate to rotate.

In a specific implementable solution, the dust-proof component includes a third dust-proof plate. When the third dust-proof plate rotates to a third specified position, the third dust-proof plate shields the first connection end. When the third dust-proof plate rotates to a fourth specified position, the third dust-proof plate avoids the peer adapter. The first connection end is protected by a single dust-proof plate.

In a specific implementable solution, the dust-proof component further includes a third elastic component. The third elastic component is configured to push the third dust-proof plate to press against the guide structure. The third elastic component pushes the third dust-proof plate to be closed, thereby improving the dust-proof effect.

In a specific implementable solution, the electrical connector further includes a third connection end. The third connection end is configured to be electrically connected to a circuit board. The electrical connector is electrically connected to the circuit board by using the third connection end.

In a specific implementable solution, the third connection end includes a plurality of fisheye pins. The plurality of fisheye pins are configured to be press fit with the circuit board.

In a specific implementable solution, the third connection end includes a plurality of adapter terminals, and the plurality of adapter terminals are configured to be welded to the circuit board.

According to a second aspect, a communication system is provided, where the communication system includes a first electrical component and a second electrical component. The first electrical component includes a circuit board and a first opto-electronic adapter that is disposed on the circuit board. The first opto-electronic adapter is the opto-electronic adapter according to any one of the foregoing. The second electrical component includes a second opto-electronic adapter. The second opto-electronic adapter is an opto-electronic adapter that is connected to the first opto-electronic adapter in a pluggable manner. In the foregoing technical solution, the optical connector is connected to the peer adapter before the electrical connector. This ensures that a channel for transmitting an optical signal is communicated before a channel for transmitting an electrical signal is communicated, thereby avoiding fiber burning and improving security and reliability of the opto-electronic adapter during use.

DESCRIPTION OF EMBODIMENTS

Figure 1:
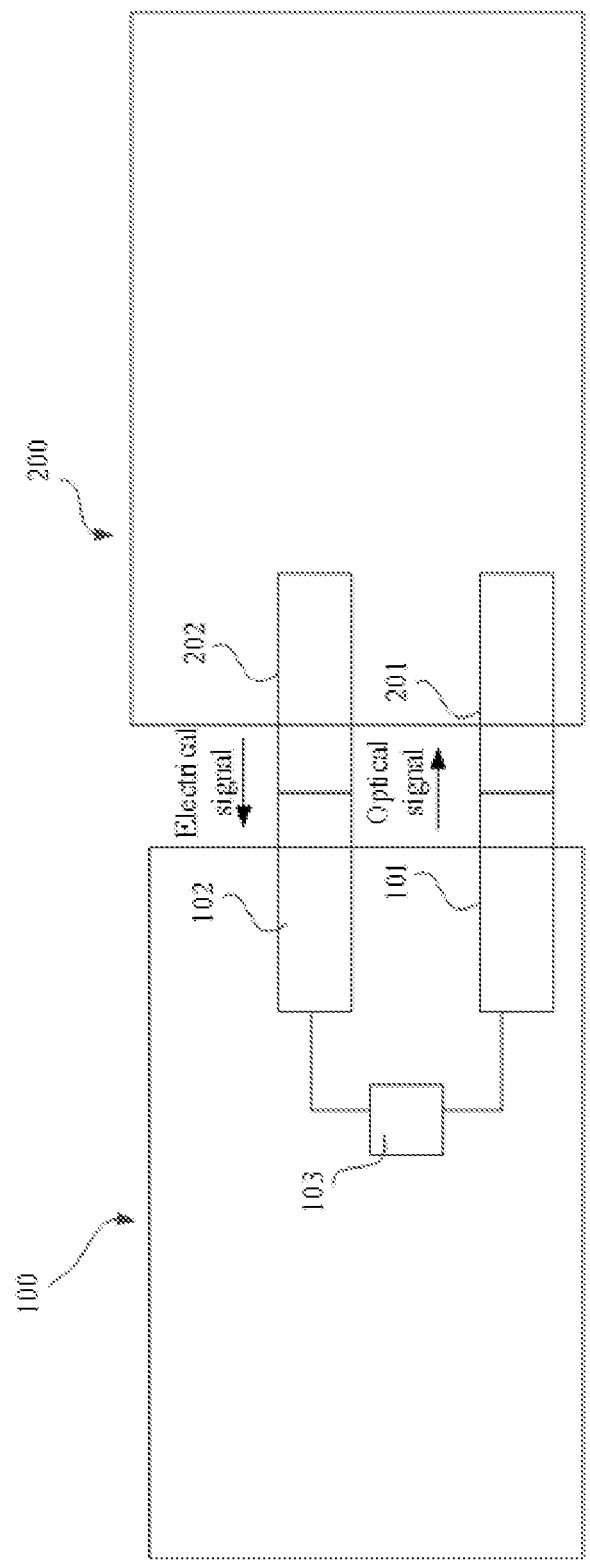
FIG. 1 shows an architecture of transmitting an optical signal and an electrical signal by a data center in the conventional technology.

For ease of understanding of an opto-electronic adapter provided in embodiments of this application, the opto-electronic adapter provided in embodiments of this disclosure is used in an application scenario of a data center, and is configured to implement a connection of an optical signal and an electrical signal between different modules in the data center. FIG. 1 shows an architecture of transmitting an optical signal and an electrical signal by a data center in the conventional technology. The data center includes a first electrical component 100 and a second electrical component 200. The first electrical component 100 is provided with a first optical connector 101 and a first electrical connector 102. The second electrical component 200 is provided with a second optical connector 201 and a second electrical connector 202.

Both the first optical connector 101 and the second optical connector 201 include a plurality of optical fibers. When the first optical connector 101 fits with the second optical connector 201, optical fibers in the two optical connectors are connected in a one-to-one correspondence manner.

Both the first electrical connector 102 and the second electrical connector 202 include a plurality of power terminals, ground terminals, and signal terminals. When the first electrical connector 102 and the second electrical connector 202 fit, the power terminals, the ground terminals, and the signal terminals in the two electrical connectors are connected in a one-to-one correspondence manner. It should be understood that the first electrical connector 102 and the second electrical connector 202 are male and female ends that fit with each other. The power terminals, the ground terminals, and the signal terminals in the first electrical connector 102, and the power terminals, the ground terminals, and the signal terminals in the second electrical connector 202 are male and female ends that fit with each other in a pluggable manner.

When the first electrical component 100 fits with the second electrical component 200, the first optical connector 101 and the second optical connector 201 are connected in a pluggable manner, and the first electrical connector 102 and the second electrical connector 202 are connected in a pluggable manner, to separately implement transmission of an optical signal and an electrical signal between the first electrical component 100 and the second electrical component 200. For example, the first electrical component 100 has a light source component 103. The second electrical component 200 supplies power to the first electrical component 100 by using the first electrical connector 102 and the second electrical connector 202 that fit with each other. The light source component 103 in the first electrical component 100 forms an optical signal based on a received electrical signal. The optical signal is transmitted to the second electrical component 200 by the first optical connector 101 and the second optical connector 201 that fit with each other.

In the foregoing application scenario, when the first electrical component 100 and the second electrical component 200 are paired, the optical connector (the first optical connector 101 and the second optical connector 201) and the electrical connector (the first electrical connector 102 and the second electrical connector 202) are synchronously connected in a pluggable manner. During connection, the first electrical connector 102 and the second electrical connector 202 may be connected before the first optical connector 101 and the second optical connector 201. However, when the first electrical connector 102 and the second electrical connector 202 are first connected, an electrical signal between the first electrical component 100 and the second electrical component 200 is already conducted, and the light source component 103 generates an optical signal. However, at this time, the first optical connector 101 and the second optical connector 201 are not connected. As a result, the generated optical signal is irradiated from an end face of the optical fiber in the first optical connector 101 to the optical fiber in the second optical connector 201, leading to optical fiber burning and causing damage to the second optical connector 201. To alleviate fiber burning, an embodiment of this disclosure provides an opto-electronic adapter. The following describes the opto-electronic adapter in detail with reference to specific accompanying drawings.

Figure 2:
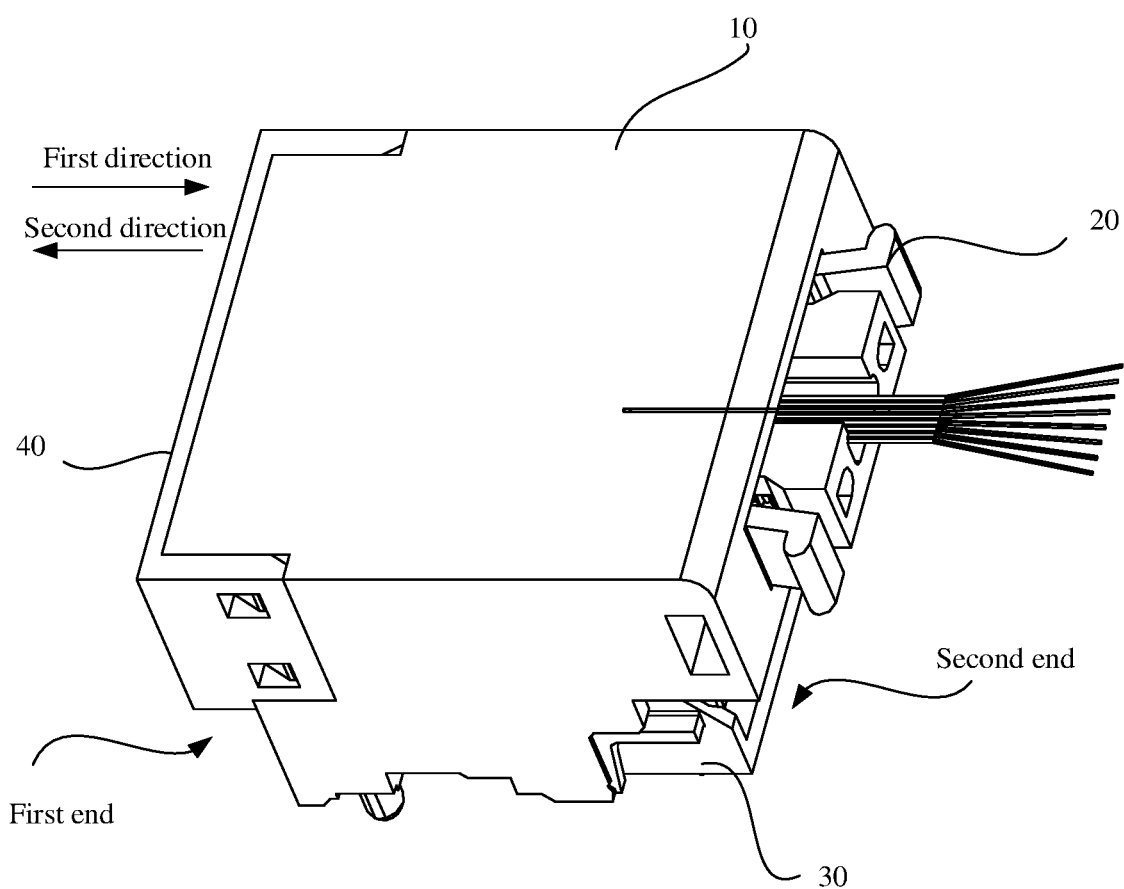
FIG. 2 is a schematic diagram of a structure of an opto-electronic adapter according to an embodiment of this application.

FIG. 2 is a schematic diagram of a structure of an opto-electronic adapter according to an embodiment of this application. For ease of describing the structure of the opto-electronic adapter, a first end and a second end of the opto-electronic adapter are first defined. The first end of the opto-electronic adapter is configured to be connected to a peer adapter in a pluggable manner. The peer adapter and the opto-electronic adapter are male and female ends of each other. The second end of the opto-electronic adapter is configured to be connected to a circuit board. When the opto-electronic adapter fits with the peer adapter, the peer adapter may be plugged into the opto-electronic adapter along a first direction (refer to FIG. 2), and may be removed from the opto-electronic adapter along a second direction. The first direction and the second direction are opposite directions.

Functional components of the opto-electronic adapter provided in this embodiment of this disclosure include an optical connector and an electrical connector. The peer adapter that fits with the opto-electronic adapter also includes a corresponding optical connector and electrical connector. For ease of description, the optical connector and the electrical connector in the opto-electronic adapter provided in this embodiment of this disclosure are named as a first optical connector 20 and a first electrical connector 30. The optical connector and the electrical connector in the peer adapter are named as a second optical connector and a second electrical connector. When the opto-electronic adapter fits with the peer adapter, the first optical connector 20 fits with the second optical connector to implement transmission of an optical signal, and the first electrical connector 30 fits with the second electrical connector to implement transmission of an electrical signal.

Figure 3:
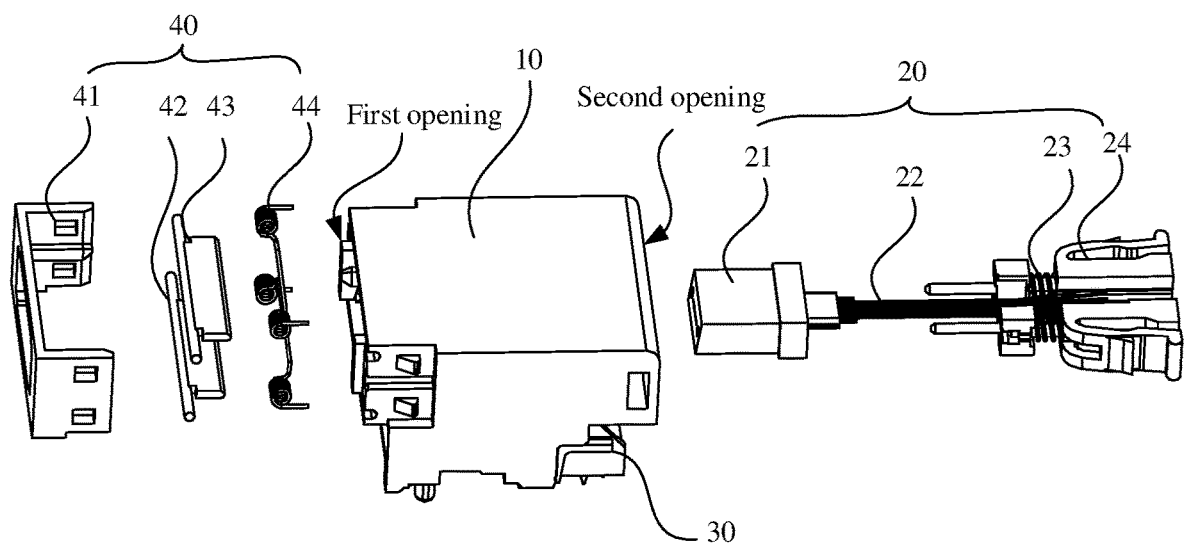
FIG. 3 is a schematic exploded view of an opto-electronic adapter according to an embodiment of this application.
Figure 4:
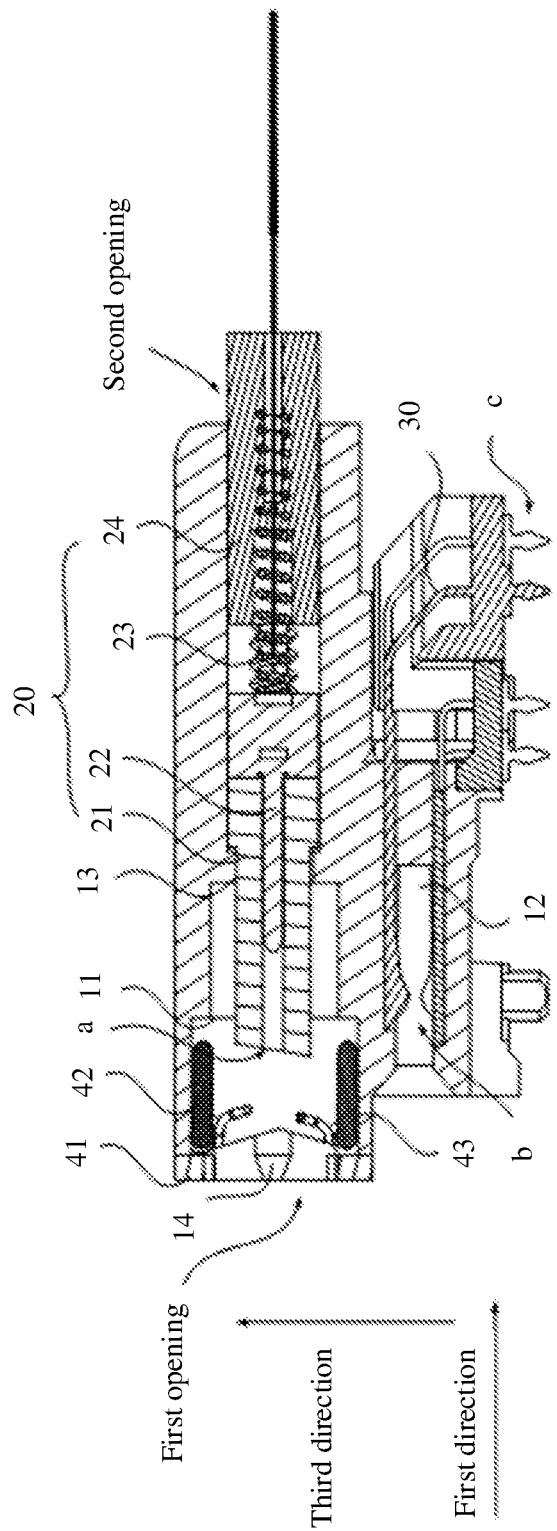
FIG. 4 is a sectional view of an opto-electronic adapter according to an embodiment of this application.

FIG. 3 is a schematic exploded view of an opto-electronic adapter according to an embodiment of this application. FIG. 4 is a sectional view of an opto-electronic adapter according to an embodiment of this application. The opto-electronic adapter provided in this embodiment of this disclosure mainly includes a housing 10, the first optical connector 20, and the first electrical connector 30. When fitting with the peer adapter, the first optical connector 20 has a first connection end a (refer to FIG. 4). The first connection end a is configured to fit with the second optical connector in the peer adapter. The first electrical connector 30 has a second connection end b (refer to FIG. 4). The second connection end b is configured to fit with the second electrical connector in the peer adapter.

The housing 10 is used as a support structural component of the first optical connector and the first electrical connector 30. The first optical connector 20 and the first electrical connector 30 are located in the housing 10.

There are openings at two ends of the housing 10. The two openings are a first opening and a second opening. The first opening is the first end of the opto-electronic adapter, and the second opening is the second end of the opto-electronic adapter. The housing 10 is divided into two cavities. For ease of description, the two cavities are named as a first cavity 11 and a second cavity 12. The first cavity 11 and the second cavity 12 are arranged in a third direction. The third direction is perpendicular to a mounting surface that is on the circuit board and that is used to fix the housing 10. The third direction is perpendicular to the first direction. The first optical connector is fixed in the first cavity 11, and the first connection end a of the first optical connector 20 faces the first opening. The first electrical connector 30 is fixed in the second cavity 12, and the second connection end b of the first electrical connector 30 faces the first opening. That is, the first connection end a and the second connection end b have a same opening direction, so that when the peer adapter is plugged into the opto-electronic adapter, the second optical connector and the second electrical connector in the peer adapter may be connected to the first connection end a and the second connection end b in a one-to-one correspondence manner.

Refer to FIG. 3 and FIG. 4. The first optical connector 20 includes a ferrule 21, a first elastic component 23, and a ferrule holder 24 that are arranged along the first direction. The ferrule holder 24 is a component that is of the first optical connector 20 and that is fixedly connected to the housing 10. When the first optical connector 20 is assembled in the first cavity 11, the ferrule holder 24 is fixedly connected to the housing 10. The ferrule 21 is a component that is of the first optical connector 20 and that fits with the peer adapter. One end that is of the ferrule 21 and that is away from the ferrule holder 24 is the first connection end a of the first optical connector 20. There are a plurality of optical fibers 22 in the ferrule 21. When the peer adapter is plugged, an optical fiber in the second optical connector is connected to the optical fiber 22 in the ferrule 21, to form a channel for transmitting an optical signal.

The ferrule 21 is slidably connected to the ferrule holder 24 and may slide along the first direction. The first elastic component 23 is disposed between the ferrule 21 and the ferrule holder 24, and is configured to push the ferrule 21 to slide along a direction away from the ferrule holder 24. For example, a guide rod (not shown in the figure) is disposed at one end that is of the ferrule 21 and that faces the ferrule holder 24. One end that is of the ferrule holder 24 and that faces the ferrule 21 is provided with a guide hole. The guide rod is slidably assembled in the guide hole. The first elastic component 23 may be a compression spring, and the guide rod is sleeved with the compression spring. When fitting with the peer adapter, the second optical connector may push the ferrule 21 to slide along the first direction. Because the ferrule holder 24 is fixed to the housing 10, the first elastic component 23 is compressed, and the first elastic component 23 provides contact pressure for connecting the ferrule 21 to the second optical connector. It should be understood that the first elastic component 23 may not simply be a compression spring. Another elastic component such as a spring plate or an elastic arm may also be used as the first elastic component 23 in this embodiment. Details are not described herein again.

In an optional solution, a limiting protrusion 13 configured to limit a sliding distance of the ferrule 21 along a direction away from the ferrule holder 24 is disposed in the housing 10. The ferrule 21 has a protruding shoulder (not shown in the figure) that fits with the limiting protrusion 13. The protruding shoulder presses against the limiting protrusion 13 under push of the first elastic component 23. The first elastic component 23 is compressed. When the peer adapter is plugged, the first elastic component 23 provides contact pressure for the first optical connector to fit with the second optical connector.

When the first optical connector 20 is assembled in the first cavity 11, the ferrule 21 and the ferrule holder 24 are plugged into the first cavity 11 from the second opening. The ferrule holder 24 is fixedly connected to the housing 10. The ferrule 21 is located in the first cavity 11, and may slide in the first cavity 11.

The ferrule holder 24 may be fixedly connected to the housing 10 in different manners. For example, the ferrule holder 24 is fixedly connected to the housing 10 by using a clip, or the ferrule holder 24 is fixedly connected to the housing 10 by using bonding adhesive, or the ferrule holder 24 may be fixedly connected to the housing 10 by using a threaded connector such as a bolt or a screw.

Figure 13:
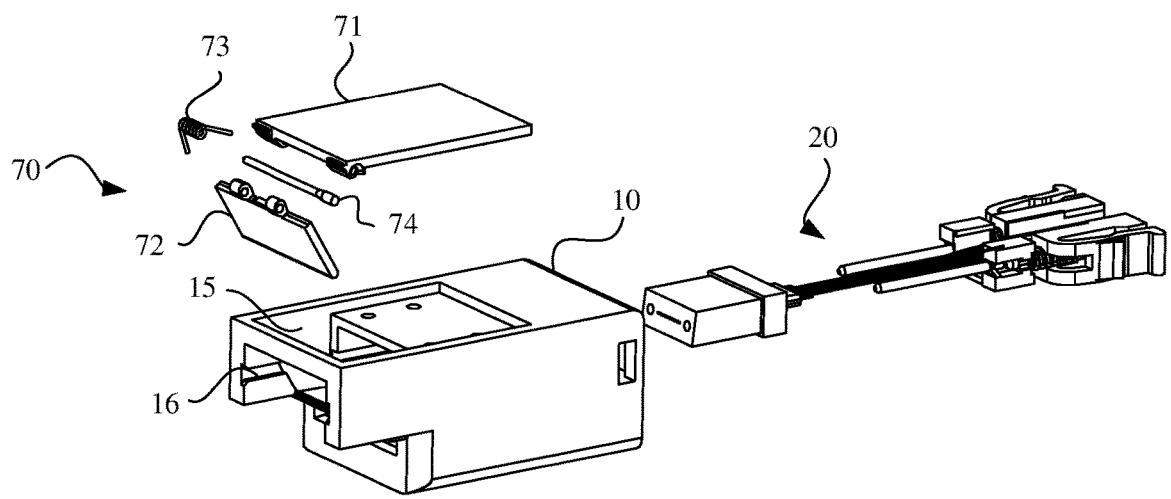
FIG. 13 is a schematic exploded view of another opto-electronic connector according to an embodiment of this application.

In an optional solution, a guide structure 14 used to guide the peer adapter to be plugged into the housing 10 is disposed in the housing 10. The guide structure 14 is located in the first cavity 11 and is close to the first opening. When the peer adapter is plugged into the first cavity 11, rough alignment is first performed by using the guide structure 14, to ensure that the peer adapter can be accurately plugged into the first cavity 11. Precise alignment between the ferrule 21 and the second optical connector is then performed, to ensure that the second optical connector fits with the optical fiber 22 in the ferrule 21. The foregoing precise alignment may be performed in a manner of fitting between a guide column and the guide hole. Details are not described herein again. For example, the guide structure 14 may be a guide protrusion or a guide groove. The guide structure 14 shown in FIG. 13 is a guide protrusion.

Refer to FIG. 4. The first electrical connector 30 is fixedly connected to the housing 10. For example, the first electrical connector 30 and the housing 10 may be fastened or assembled in an integrated manner. The first electrical connector 30 has the second connection end b that fits with the peer adapter, and a third connection end c that is configured to be connected to the circuit board. The second connection end b is configured to be connected to the second electrical connector in the peer adapter. The third connection end c is configured to be connected to the circuit board.

The second connection end b of the first electrical connector 30 has a plurality of connection terminals. The plurality of connection terminals may be divided into power terminals, ground terminals, and signal terminals by function. In this embodiment of this application, each of the connection terminals includes a pair of spring plates (not shown in the figure). When fitting with the housing 10, the first electrical connector 30 is fixedly connected to the housing 10. The second connection end b is plugged into the second cavity 12. Two spring plates in each pair of spring plates press against two opposite side walls of the second cavity 12.

When a plurality of pairs of spring plates are disposed, the plurality of pairs of spring plates are arranged in a row along a fourth direction, and arranged in a column along the first direction. The fourth direction is perpendicular to the first direction and the third direction. In FIG. 4, the fourth direction is a direction perpendicular to paper. For example, the plurality of pairs of spring plates may be arranged in different rows, for example, one row, two rows, or three rows. The plurality of pairs of spring plates are arranged along the first direction.

The plurality of pairs of spring plates are divided, by function, into spring plates with different functions, such as ground spring plates (ground terminals), signal spring plates (signal terminals), and power spring plates (power terminals). When the plurality of pairs of spring plates are arranged in different rows, the spring plates with different functions may be located in the different rows as required. This is not specifically limited in this embodiment of this application.

The second electrical connector in the peer adapter has a golden finger that fits with the plurality of pairs of spring plates. The golden finger has a pin corresponding to each pair of spring plates. Pins are divided into power pins, signal pins, and ground pins based on functions of the spring plates. When the second electrical connector fits with the first electrical connector 30, the golden finger is plugged between paired spring plates, and presses against the spring plates. In this embodiment of this application, a connection between the second connection end b of the first electrical connector 30 and the peer adapter means that spring plates with a same function are connected to the pins in a one-to-one correspondence manner. For example, a connection between the first electrical connector 30 and the second electrical connector means a connection between the power pin and the power spring plate, a connection between the signal pin and the signal spring plate, and a connection between the ground pin and the ground spring plate.

Refer to FIG. 4. The third connection end c of the first electrical connector 30 includes a plurality of fisheye pins. The plurality of fisheye pins are configured to be press fit with the circuit board. The fisheye pins are in a one-to-one correspondence manner with the paired spring plates, to ensure that the paired spring plates are electrically connected to the circuit board.

The plurality of fisheye pins are disposed on a side that is of the first electrical connector 30 and that faces the circuit board. A notch that avoids the fisheye pins is correspondingly disposed on the housing 10, to ensure that the fisheye pins may be connected to the circuit board in a pluggable manner. When the opto-electronic adapter is fixed on the circuit board, the fisheye pins are press fit on the circuit board. The fisheye pins are used as an electrical connecting piece between the opto-electronic adapter and the circuit board, and are also used as a connecting piece for fixedly connecting the opto-electronic adapter and the circuit board.

When the first optical connector 20 and the first electrical connector 30 are configured, it can be seen that the first connection end may slide along the first direction relative to the second connection end. The first connection end a is configured to be connected to the peer adapter before the second connection end b. Refer to the structure shown in FIG. 4. When the first optical connector 20 and the first electrical connector 30 are located in the housing 10, the first connection end a may slide relative to the housing 10, and the second connection end b is fixed relative to the housing 10. When fitting with the peer adapter, the first connection end a is first connected to the first optical connector in the peer adapter, and the second connection end b is connected to the electrical connector in the peer adapter after the first connection end a. That is, when the first connection end a is connected to the second optical connector, the second connection end b is not connected to the second electrical connector. That the second connection end b is not connected to the peer adapter includes the following cases:

(1) The second connection end b is not in any contact with the second electrical connector. The spring plates with different functions at the second connection end b are not connected to pins with different functions in the second electrical connector in a one-to-one correspondence manner. To be specific, the power spring plate is not connected to the power pin. The ground spring plate is not connected to the ground pin. The signal spring plate is not connected to the signal pin.

(2) Some spring plates at the second connection end b are not in contact with the second electrical connector. Either of the power spring plate and the signal spring plate at the second connection end b is not in contact with the corresponding pin in the second electrical connector. Specifically, the following cases may be included:

(a) The power spring plate is connected to the power pin. The ground spring plate is connected to the ground pin. However, the signal spring plate is not connected to the signal pin.

(b) The signal spring plate is connected to the signal pin. The ground spring plate is connected to the ground pin. However, the power spring plate is not connected to the power pin.

(c) The ground spring plate is connected to the ground pin. However, the power spring plate is not connected to the power pin, and the signal spring plate is not connected to the signal pin.

To facilitate understanding of a case in which the first connection end a and the second connection end b that are provided in this embodiment of this disclosure fit with the peer adapter, the first electrical connector 30 is connected to the second electrical connector in a ground-power-signal sequence. The following describes in detail an effect of fitting between the opto-electronic adapter and the peer adapter with reference to accompanying drawings.

Figure 5:
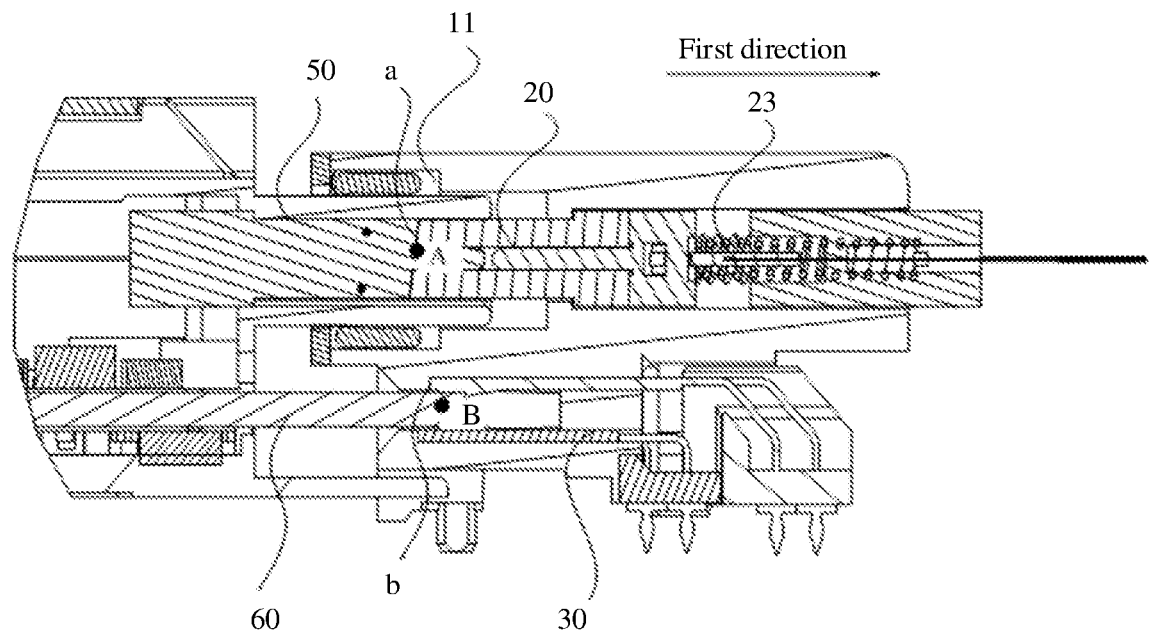
FIG. 5 to FIG. 7 are flowcharts of fitting of an opto-electronic adapter with a peer adapter according to an embodiment of this application.

FIG. 5 is a schematic diagram of a state when an opto-electronic adapter first contacts a peer adapter. A second optical connector 50 in the peer adapter is plugged into the first cavity 11 along the first direction. The ferrule in the second optical connector 50 is connected to the ferrule in the first optical connector 20. For the connection between a second electrical connector 60 and the first electrical connector 30, only the ground pin and the ground spring plate are connected, and neither the power pin nor the signal pin is connected to the power spring plate or the signal spring plate, respectively. In this case, the first optical connector 20 is connected to the peer adapter before the first electrical connector 30.

Figure 6:
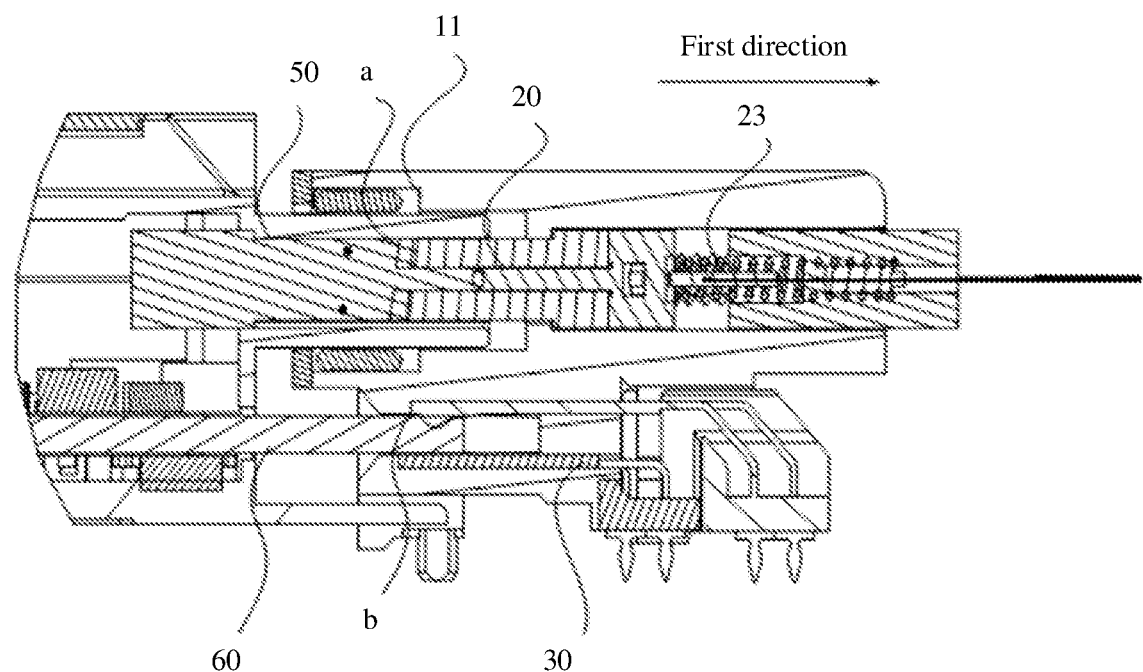

Refer to FIG. 6. The peer adapter continues to slide along the first direction. The ferrule in the first opto-electronic connector 20 slides along the first direction under push of the second optical connector 50. The first elastic component 23 is compressed. In a process in which the first elastic component 23 is compressed, the first elastic component 23 continuously provides contact pressure required for connecting the first optical connector 20 to the second optical connector 50. In addition, in a process in which the peer adapter continues to slide, the power pin in the second electrical connector 60 is connected to the power spring plate in the first electrical connector 30.

Figure 7:
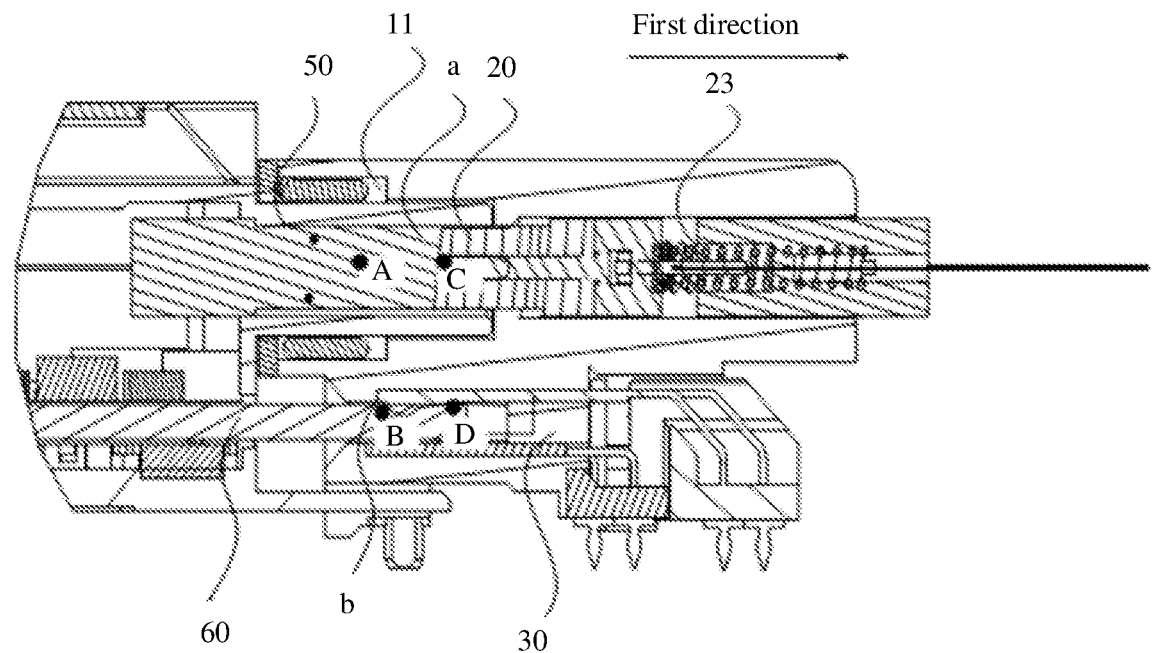

Refer to FIG. 7. Along the first direction, the peer adapter continues to slide, and the first elastic component 23 continues to be compressed. The first optical connector 20 and the second optical connector 50 remain connected. In a sliding process of the peer adapter, the signal pin in the second electrical connector 60 is connected to the signal spring plate in the first electrical connector 30.

It can be learned from FIG. 5 to FIG. 7 that when the opto-electronic adapter is not connected to the peer adapter, the first connection end is closer to the first end compared with the second connection end; and when the opto-electronic adapter is connected to the peer adapter, the second connection end is closer to the first end compared with the first connection end. With reference to FIG. 7, it can be learned that when the first connection end is not connected to the peer adapter, a position A of the first connection end is located on a left side of the second connection end (a position shown by a point B); and when the peer adapter is connected to the opto-electronic adapter, a position C of the first connection end is located on a right side of the second connection end. According to a feature that relative positions of the second optical connector and the second electrical connector that are in the peer adapter are fixed, it can be seen that when the peer adapter is just plugged into the opto-electronic adapter, because the first connection end is closer to the first end compared with the second connection end, the second optical connector is first connected to the first optical connector, and the second electrical connector is connected to the first electrical connector after the two optical connectors are connected.

In a process in which the opto-electronic adapter is connected to the peer adapter, a sliding distance of the first connection end is a distance from the point A to a point C. A distance at which the peer adapter is plugged into the first electrical connector is a distance from the point B to a point D. That is, the first connection end and the second connection end meet the following condition: When the first connection end is connected to the peer adapter, a sliding distance of the first connection end relative to the second connection end is d1 (the distance from the point A to the point C), a fitting distance of the second connection end to be plugged into the peer adapter is d2 (the distance between the point B to the point D), and d1 and d2 satisfy d1>d2.

In an optional solution, when the opto-electronic adapter is not connected to the peer adapter, a relative relationship between the first connection end and the second connection end may further be that the first connection end is away from the first end compared with the second connection end, or the first connection end and the second connection end have a same distance from the first end. However, regardless of which of the foregoing setting manners is used, it can be ensured that the first connection end is connected to the peer adapter before the second connection end, provided that when the opto-electronic adapter fits with the peer adapter, the sliding distance of the first connection end relative to the second connection end is greater than the fitting distance of the second connection end to be plugged into the peer adapter.

It can be learned from the foregoing description that a time sequence of a connection between the opto-electronic adapter and the peer adapter provided in embodiments of this disclosure is that: by using an implementation of a time difference between optical and electrical fitting, the first optical connector 20 and the second optical connector 50 fit with each other, and then a sliding distance for electrical fitting (fitting between the first electrical connector 30 and the second electrical connector 60) is compatible through floating. The floating means that the first elastic component 23 (the compression spring) is disposed inside the first optical connector 20. In this way, in a process in which a fitting side (including the ground pin, the power pin, and the signal pin) of the second electrical connector 60 is in contact with the spring plate of the first electrical connector 30 in sequence and continuously moves forward, the first elastic component 23 is continuously compressed and moves backward, but an elastic force of the first elastic component 23 always maintains a reliable connection of an optical fitting surface (a connection surface between the first optical connector 20 and the second optical connector 50) between the peer adapter and the opto-electronic adapter. In this way, a channel for transmitting an optical signal is connected before a channel for transmitting an electrical signal, and problems of electrical performance connection and burning of an end face of the ferrule in a high-power application scenario in a fitting case are resolved.

In addition, when the peer adapter is removed, the first electrical connector 30 may be disconnected from the peer adapter before the first optical connector 20. That is, the first connection end is further configured to be disconnected from the peer adapter after the second connection end. When the peer adapter is disconnected from the opto-electronic adapter, the peer adapter is removed along the second direction, and the first electrical connector 30 starts to be disconnected from the peer adapter. In a disconnection process, each of the spring plates in the first electrical connector 30 is sequentially disconnected from the corresponding pin in the peer adapter in a sequence of the signal spring plate, the power spring plate, and the ground spring plate. The following provides description with reference to specific accompanying drawings.

Figure 8:
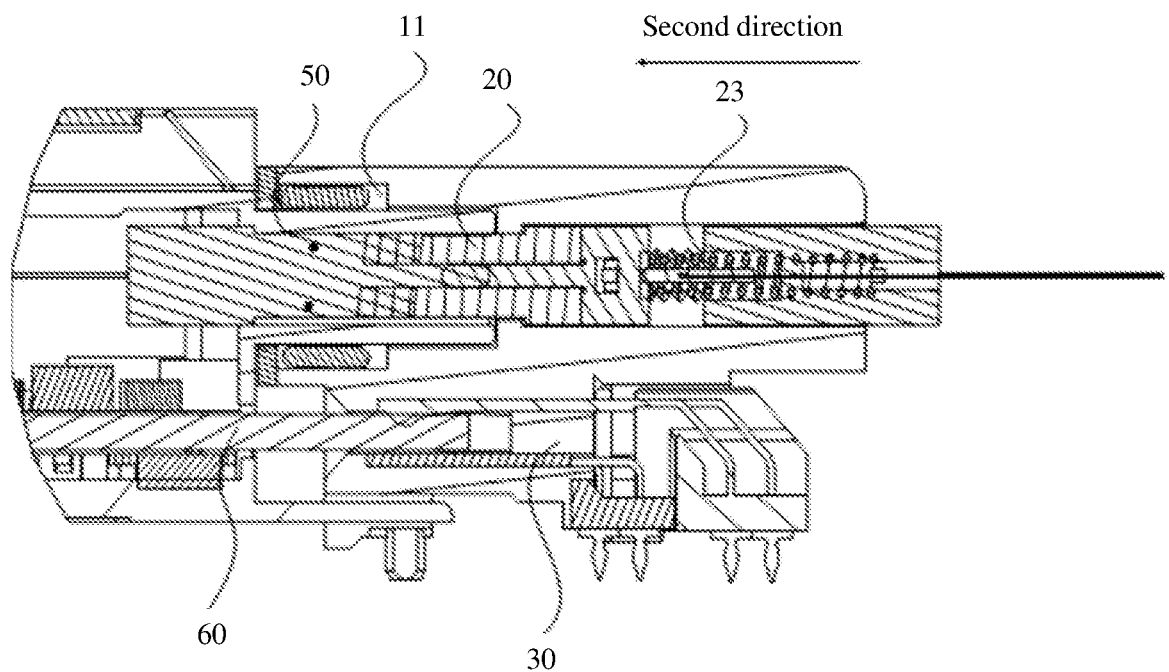
FIG. 8 to FIG. 10 are flowcharts of disconnecting an opto-electronic adapter from a peer adapter according to an embodiment of this application.

FIG. 8 is a schematic diagram of an opto-electronic adapter starting to be disconnected from a peer adapter. In the state shown in FIG. 8, the power spring plate, the signal spring plate, and the ground spring plate in the first electrical connector 30 are connected to the power pin, the signal pin, and the ground pin in the peer adapter in a one-to-one correspondence manner. That is, the first electrical connector 30 is connected to the second electrical connector 60. The first optical connector 20 is also connected to the second optical connector 50. In a process in which the peer adapter is disconnected from the opto-electronic adapter, the signal spring plate in the first electrical connector 30 is disconnected from the signal pin in the second electrical connector 60. The first optical connector 20 slides along the second direction under push of the first elastic component 23, but the ferrule in the first optical connector 20 is still connected to the ferrule in the second optical connector 50. After the signal spring plate is disconnected from the signal pin, an electrical signal channel between the opto-electronic adapter and the peer adapter is disconnected, but an optical signal channel is still connected.

Figure 9:
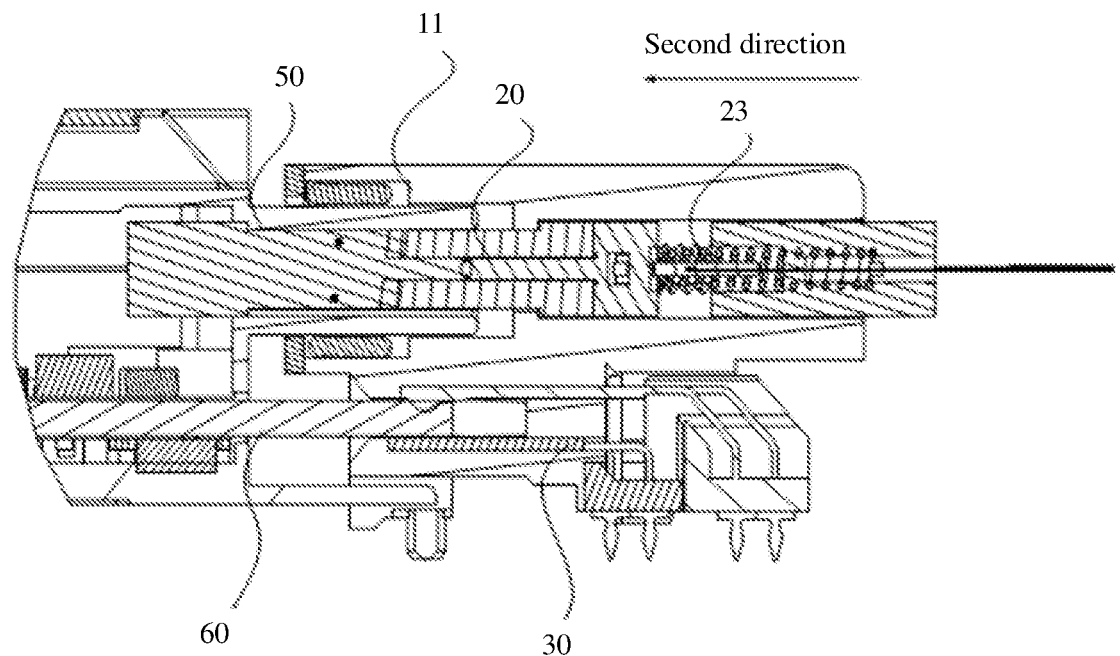

Refer to FIG. 9. The peer adapter continues to slide along the second direction. The power spring plate in the first electrical connector 30 is disconnected from the power pin in the second electrical connector 60. The first optical connector 20 continues to slide along the second direction under push of the first elastic component 23, but the ferrule in the first optical connector is still connected to the ferrule in the second optical connector 50.

Figure 10:
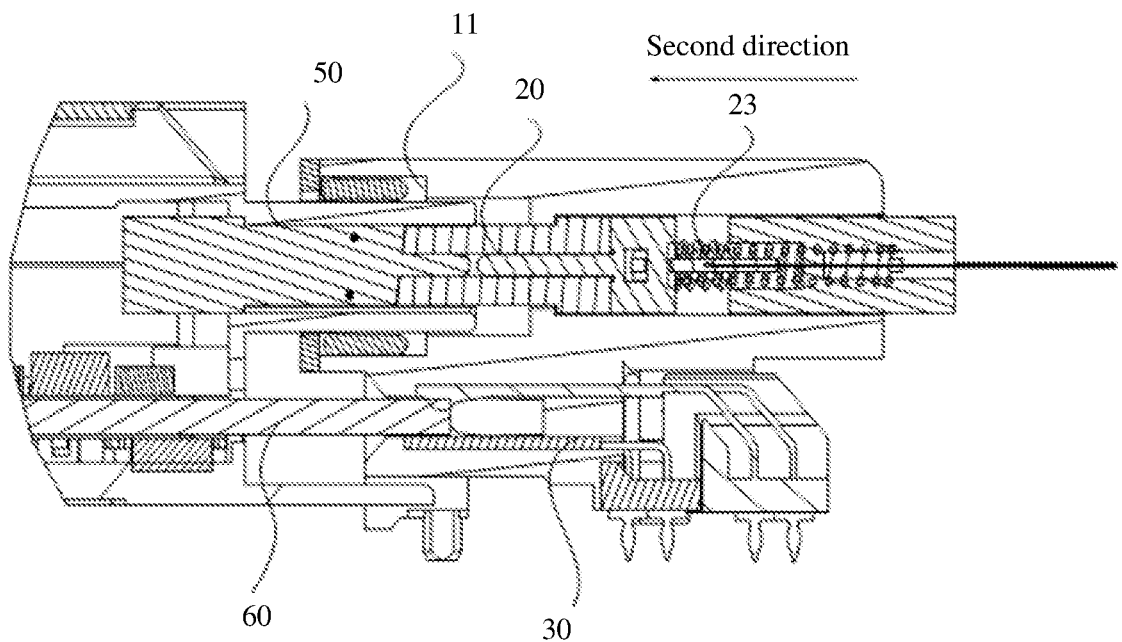

Refer to FIG. 10. The peer adapter continues to slide along the second direction. The ground spring plate in the first electrical connector 30 is disconnected from the ground pin in the second electrical connector 60. In this case, the first electrical connector 30 is disconnected from the second electrical connector 60. The first optical connector 20 is disconnected from the second optical connector 50.

It can be learned from FIG. 8 to FIG. 10 that a time sequence of a disconnection between the first electrical connector 30 and the peer adapter provided in embodiments of this disclosure is that: by using an implementation of a time difference between fitting of the first optical connector 20 and the peer adapter and fitting of the first electrical connector 30 and the peer adapter, in the process in which the opto-electronic adapter is disconnected from the peer adapter, a sliding distance for fitting between the first electrical connector 30 and the second electrical connector 60 is compatible through floating of the first optical connector 20. In this way, in a scenario in which the opto-electronic adapter is disconnected from the peer adapter, the first optical connector 20 may always remain connected to the peer adapter before the first electrical connector 30 is disconnected. That is, before an electrical signal is disconnected, the optical signal channel may always remain connected, to avoid burning of the end face of the ferrule in a high-power application scenario.

In addition to the foregoing case of burning caused by communication of the channel for transmitting an electrical signal before the channel for transmitting an optical signal, burning of the optical fiber of the ferrule further includes burning caused by a case that the optical fiber of the ferrule in the first optical connector cannot be tightly attached to the optical fiber of the peer adapter due to accumulated dust in an end area of the optical fiber of the ferrule.

Refer to FIG. 2 to FIG. 4. A dust-proof component 40 configured to shield the first connection end is further disposed in the opto-electronic adapter provided in this embodiment. The dust-proof component 40 is rotatably connected to the housing 10. When the peer adapter is plugged into the housing 10, the dust-proof component 40 may avoid the peer adapter. The dust-proof component 40 includes a support 41, a first dust-proof plate 42, and a second dust-proof plate 43.

The support 41 is a support structure of the dust-proof component 40. The support 41 is a U-shaped structure. A middle part of the U-shaped structure is opened, and parts on two sides are bent to form the U-shaped structure. When the support 41 is fastened on the housing 10, an opening of the support 41 communicates with the first opening of the first cavity 11. Two bent parts are fixedly connected to the housing 10 by using a clip. When the peer adapter fits with the opto-electronic adapter, the peer adapter may be plugged into the first cavity 11 through the opening in the middle part.

A shape of the opening of the support 41 is the same as a shape of a structure in which the peer adapter is plugged into the first cavity 11. A size of the opening of the support 41 is greater than a size of the structure in which the peer adapter is plugged into the first cavity 11, to ensure that the peer adapter is plugged. In addition, sizes of the opening and an opening of the first cavity 11 are not specifically limited in this application. The size of the opening of the support 41 may be greater than, less than, or equal to a size of the opening of the first cavity 11.

In an optional solution, the support 41 and the housing 10 may further be an integrated structure.

The first dust-proof plate 42 and the second dust-proof plate 43 are disposed in the middle part of the support 41, and are rotatably connected to the support 41. When the dust-proof component 40 is assembled on the housing 10, the first dust-proof plate 42 and the second dust-proof plate 43 are located in the first cavity 11 and opened inwards. Opening inwards means that the first dust-proof plate 42 and the second dust-proof plate 43 rotate inwards into the first cavity 11.

A second elastic component 44 is further disposed in the dust-proof component 40. A quantity of the second elastic components 44 is two. Two second elastic components 44 are configured to push the first dust-proof plate 42 and the second dust-proof plate 43 to be located in the first specified position. For example, the second elastic component 44 is a torsion spring. A rotating shaft by which the first dust-proof plate 42 and the support 41 are rotatably connected is sleeved with one of torsion springs. One end of the torsion spring presses against the first dust-proof plate 42, and another end presses against a side wall of the first cavity 11. The first dust-proof plate 42 is pushed to press against the guide structure 14 under an elastic force of the torsion spring. Similarly, another torsion spring is also disposed in a similar manner, to push the second dust-proof plate 43 to press against the guide structure 14.

FIG. 3 shows a state when the first dust-proof plate 42 and the second dust-proof plate 43 are opened. The first dust-proof plate 42 and the second dust-proof plate 43 rotate clockwise and counter-clockwise, respectively. The first dust-proof plate 42 and the second dust-proof plate 43 rotate to a second specified position. At the second specified position, the first dust-proof plate 42 and the second dust-proof plate 43 are parallel to or approximately parallel to two opposite side walls of the first cavity 11, to avoid the peer adapter. The second specified position corresponds to a state when the peer adapter is plugged. When the peer adapter is plugged into the first cavity 11, the peer adapter pushes the first dust-proof plate 42 and the second dust-proof plate 43 to rotate inwards, to push the first dust-proof plate 42 and the second dust-proof plate 43 to be plugged into the first cavity 11.

Figure 11:
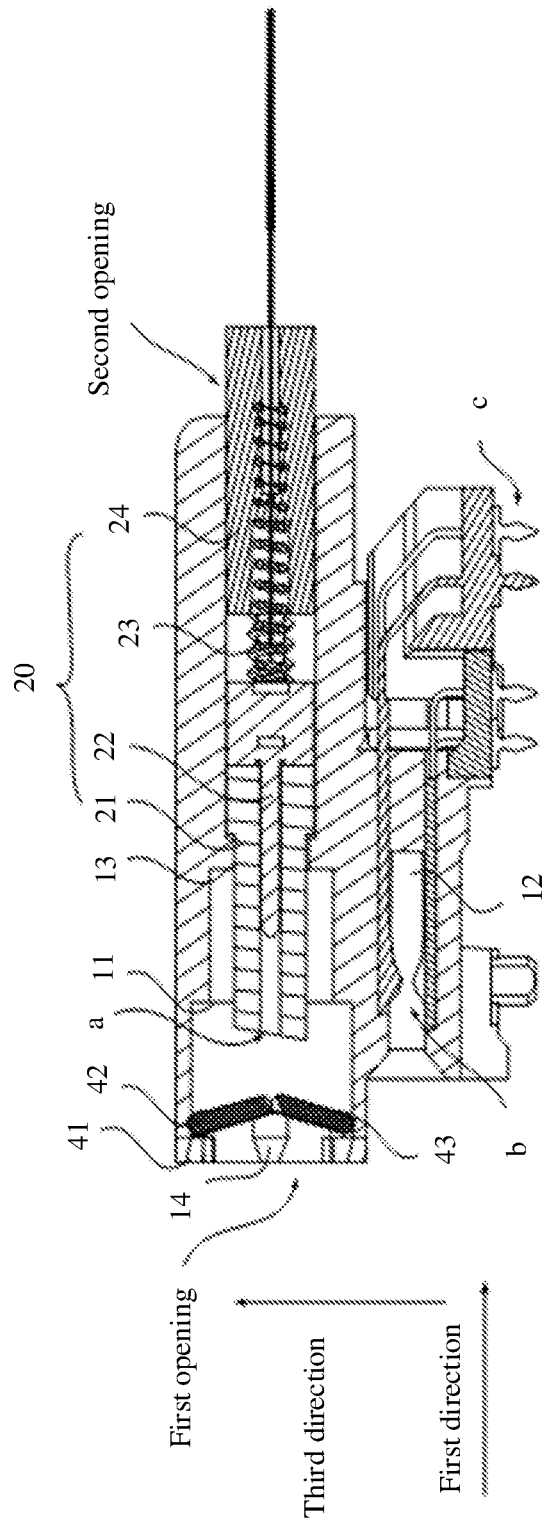
FIG. 11 is a schematic diagram of a state of an unused opto-electronic connector according to an embodiment of this application.

FIG. 11 shows a state when the first dust-proof plate 42 and the second dust-proof plate 43 are closed. When the first dust-proof plate 42 and the second dust-proof plate 43 rotate to the first specified position, the first dust-proof plate 42 and the second dust-proof plate 43 block the opening in the middle part of the support 41. In this case, the first cavity 11 is a sealed space. Dust outside the housing 10 is blocked by the first dust-proof plate 42 and the second dust-proof plate 43, and cannot enter the first cavity 11.

At the first specified position, the first dust-proof plate 42 and the second dust-proof plate 43 press against the guide structure 14 of the first cavity 11. On one hand, the guide structure 14 is configured to limit limiting positions of the first dust-proof plate 42 and the second dust-proof plate 43. On the other hand, the guide structure 14 is configured to guide the peer adapter.

When the first dust-proof plate 42 and the second dust-proof plate 43 are closed, the guide structure 14 is located outside the dust-proof component 40, to ensure that when the peer adapter is plugged into the first cavity 11, the peer adapter first fits with the guide structure 14. This ensures that the peer adapter may be accurately plugged into the first cavity 11.

In an optional solution, the guide structure 14 is a V-shaped structure. A tip part of the V-shaped structure faces the first connection end of the ferrule 21. When the first dust-proof plate 42 and the second dust-proof plate 43 are located in the first specified position, the first dust-proof plate 42 and the second dust-proof plate 43 press against two bevels of the guide structure 14, so that the first dust-proof plate 42 and the second dust-proof plate 43 are of a V-shaped structure. An opening direction of the V-shaped structure formed by the first dust-proof plate 42 and the second dust-proof plate 43 is away from the first end. The tip part faces the first connection end of the ferrule, to facilitate the peer adapter to push the first dust-proof plate 42 and the second dust-proof plate 43 to rotate.

It can be seen from the foregoing description that, when the first dust-proof plate 42 and the second dust-proof plate 43 rotate to the first specified position, the first dust-proof plate 42 and the second dust-proof plate 43 shield the first connection end. When the first dust-proof plate 42 and the second dust-proof plate 43 rotate to the second specified position, the first dust-proof plate 42 and the second dust-proof plate 43 avoid the peer adapter. In this way, the first connection end is protected by the disposed side-by-side dust-proof component 40.

Figure 12:
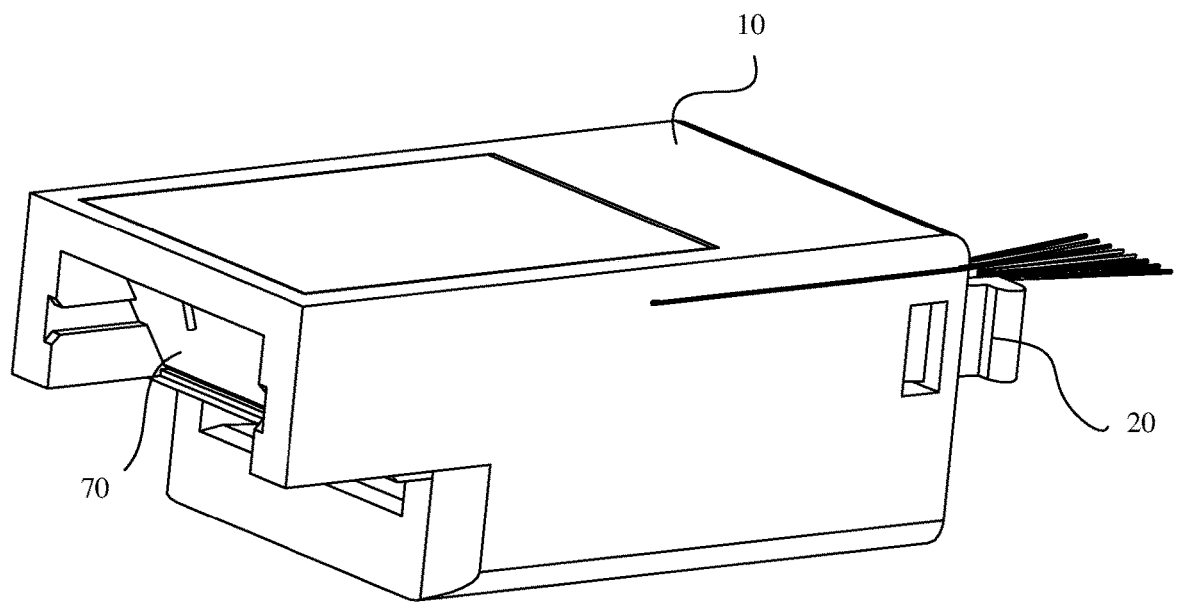
FIG. 12 is a schematic diagram of a structure of another opto-electronic connector according to an embodiment of this application.

FIG. 12 shows another opto-electronic adapter based on the opto-electronic adapter shown in FIG. 3. FIG. 13 is a schematic exploded view of the opto-electronic adapter shown in FIG. 12. For some reference numerals in FIG. 12 and FIG. 13, refer to the same reference numerals in FIG. 4. For structures of the first optical connector and the first electrical connector in FIG. 12, refer to related description in FIG. 3. Details are not described herein again.

A dust-proof component 70 configured to shield the first connection end is disposed in the opto-electronic adapter provided in this embodiment. The dust-proof component 70 is rotatably connected to the housing 10. When the peer adapter is plugged into the housing 10, the dust-proof component 70 may avoid the peer adapter. The dust-proof component 70 includes a support 71 and a third dust-proof plate 72. The support 71 and the third dust-proof plate 72 are rotatably connected by a rotating shaft 74. The support 71 is a support structure of the dust-proof component 70. The support 71 is a plate structure. When the support 71 is fastened on the housing 10, the plate structure is located at a fixed part of the housing 10. A gap 15 for plugging of the third dust-proof plate 72 is disposed in the housing 10. The third dust-proof plate is located in the first cavity after passing through the gap 15. When the peer adapter fits with the opto-electronic adapter, the peer adapter may be plugged into the first cavity. It should be understood that the support 71 and the housing 10 may further be of an integrated structure. In this case, the third dust-proof plate 72 is rotatably connected to the housing 10.

As shown in FIG. 12, when the third dust-proof plate 72 rotates to a third specified position, the third dust-proof plate 72 shields the first connection end. When the third dust-proof plate 72 rotates to a fourth specified position, the third dust-proof plate 72 avoids the peer adapter. The first connection end is protected by a single dust-proof plate. In addition, the dust-proof component 70 further includes a third elastic component 73. The third elastic component 73 is configured to push the third dust-proof plate 72 to press against a limiting protrusion 16 of the housing 10. A side that is of the limiting protrusion 16 and that faces the first cavity is an inclined slope. When the third dust-proof plate 72 presses against the limiting protrusion 16, the third dust-proof plate 72 is in an inclined state, so that the peer adapter pushes the third dust-proof plate 72 to rotate in a specified direction.

In an optional solution, a guide groove used to guide the peer adapter to be drawn into the first cavity is disposed on the limiting protrusion 16, to facilitate plugging of the peer adapter into the first cavity. It should be understood that the opto-electronic adapter shown in FIG. 12 may also use the guide protrusion shown in FIG. 3. When the guide protrusion is used, the third dust-proof plate presses against the guide protrusion and forms an inclined state, to facilitate the plugging of the peer adapter.

Figure 14:
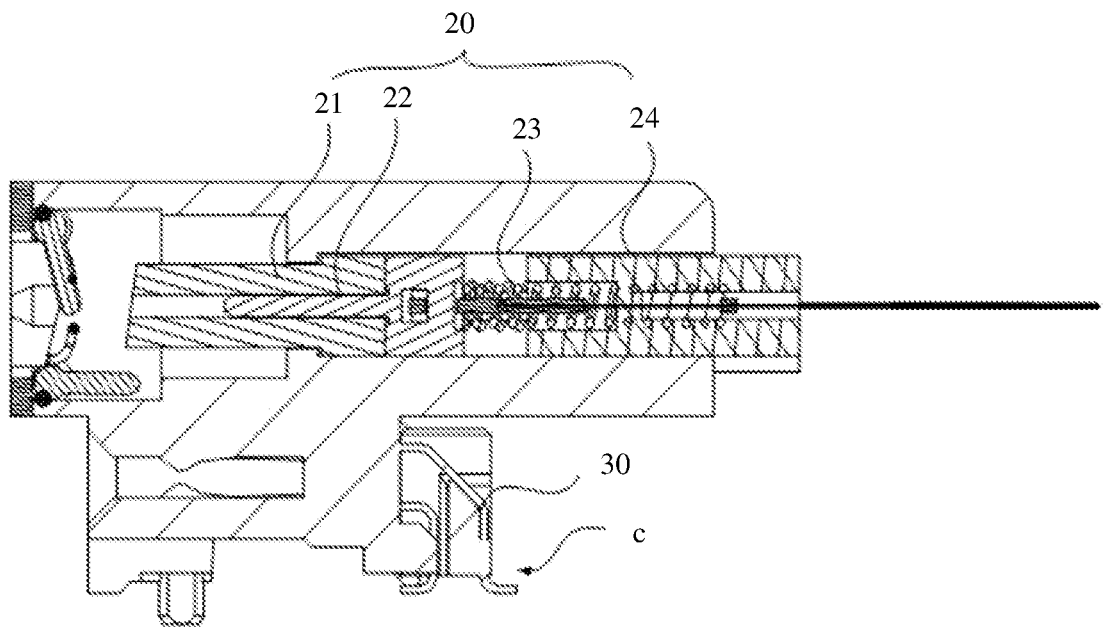
FIG. 14 is a schematic diagram of a structure of another opto-electronic connector according to an embodiment of this application.

FIG. 14 shows another opto-electronic adapter according to an embodiment of this application. For some reference numerals in FIG. 14, refer to the same reference numerals in FIG. 4. A difference between the opto-electronic adapter shown in FIG. 14 and the opto-electronic adapter shown in FIG. 4 lies in that the third connection end c of the first electrical connector 30 includes a plurality of adapter terminals. The plurality of adapter terminals are configured to be welded to the circuit board. When connected to the circuit board, the third connection end c may be fixedly connected to the circuit board in a reflow soldering manner.

The opto-electronic adapter provided in this embodiment also includes a dust-proof component. The dust-proof component may be the dust-proof component shown in FIG. 11 or FIG. 12. Details are not described herein again.

An embodiment of this disclosure further provides a communication system. The communication system includes a first electrical component and a second electrical component. The first electrical component includes a circuit board and a first opto-electronic adapter that is disposed on the circuit board. The first opto-electronic adapter is the opto-electronic adapter according to any one of the foregoing. The second electrical component includes a second opto-electronic adapter. The second opto-electronic adapter is an opto-electronic adapter that is connected to the first opto-electronic adapter in a pluggable manner. In the foregoing technical solution, the optical connector is connected to the peer adapter before the electrical connector. This ensures that a channel for transmitting an optical signal is communicated before a channel for transmitting an electrical signal is communicated, thereby avoiding fiber burning and improving security and reliability of the opto-electronic adapter during use.

Figure 15:
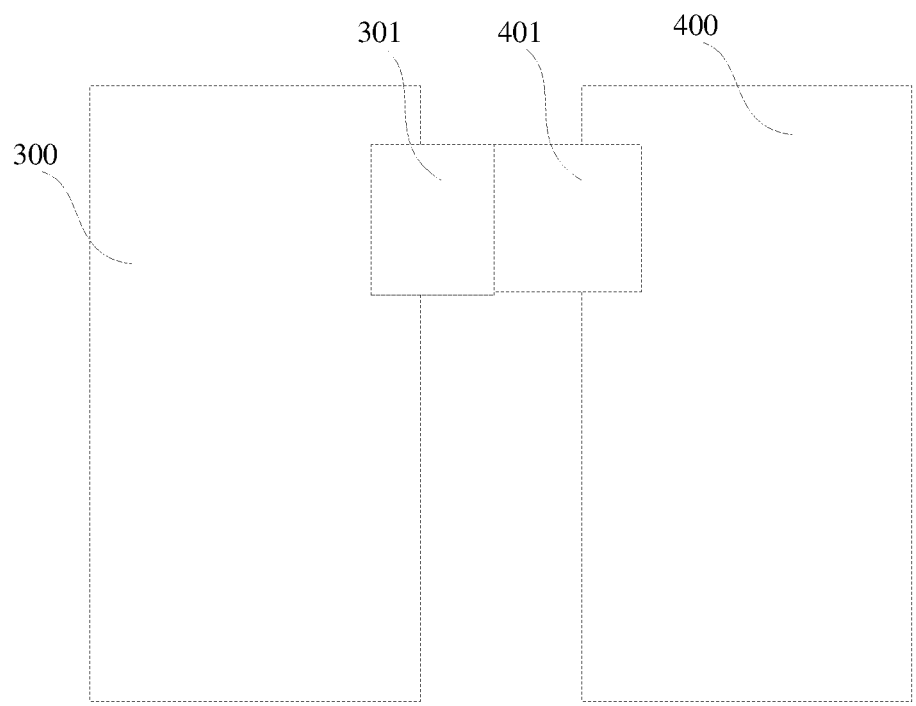
FIG. 15 is a schematic diagram of an application scenario of an opto-electronic connector according to an embodiment of this application.

FIG. 15 is a schematic diagram of a structure of interconnection between boards. Both the first electrical component and the second electrical component are boards, and are named as a first board 300 and a second board 400, respectively, for ease of description. The first board 300 and the second board 400 may be common boards such as a backplane and a plugboard. When the first board 300 and the second board 400 are interconnected, the first board 300 and the second board 400 are interconnected by a first opto-electronic adapter 301 and a second opto-electronic adapter 401.

Figure 16:
FIG. 16 is a schematic diagram of an application scenario of an opto-electronic connector according to an embodiment of this application.

FIG. 16 is a schematic diagram of a structure of intra-board interconnection. The first electrical component is a mother board 500, and the second electrical component is a daughter board 600. When the mother board 500 is connected to the daughter board 600, the mother board 500 is connected to the daughter board 600 by a first opto-electronic adapter 501 and a second opto-electronic adapter 601.

Figure 17:
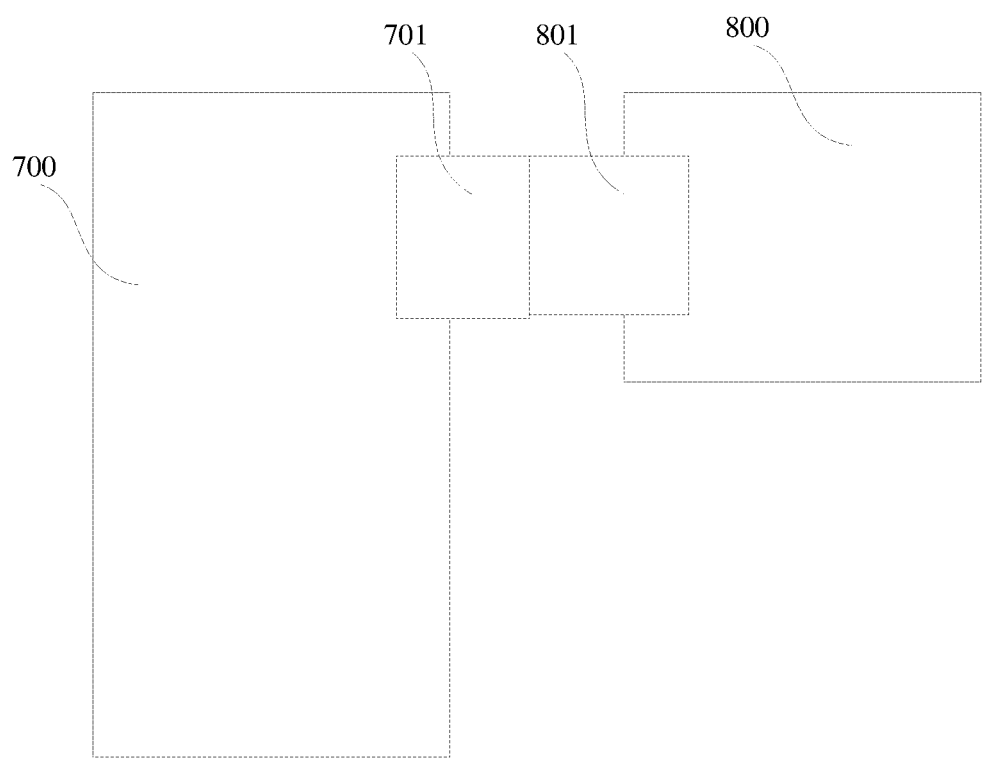
FIG. 17 is a schematic diagram of an application scenario of an opto-electronic connector according to an embodiment of this application.

FIG. 17 is a schematic diagram of a structure of fitting of a panel 700. The first electrical component is a panel 700, and the second electrical component is an external module 800. The external module 800 may be an external light source module. When the panel 700 fits with the external module 800, the panel 700 is connected to the external module 800 by a first opto-electronic adapter 701 and a second opto-electronic adapter 801.

It is clear that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. An opto-electronic adapter comprising: an optical connector and an electrical connector that are stacked, wherein
the optical connector has a first connection end configured to fit with a peer adapter, and the electrical connector has a second connection end configured to fit with the peer adapter;
the first connection end and the second connection end have a same opening direction; and
the first connection end is configured to slide along a first direction relative to the second connection end,
the first direction is a plugging direction of the peer adapter, and the first connection end is configured to be connected to the peer adapter before the second connection end.

2. The opto-electronic adapter according to claim 1, wherein the first connection end is further configured to be disconnected from the peer adapter after the second connection end.

3. The opto-electronic adapter according to claim 1, wherein when the first connection end is connected to the peer adapter, a sliding distance of the first connection end relative to the second connection end is d1, a fitting distance of the second connection end to be plugged into the peer adapter is d2, and d1 and d2 satisfy d1>d2.

4. The opto-electronic adapter according to claim 1, wherein the opto-electronic adapter further comprises a housing, the optical connector and the electrical connector are located in the housing, the first connection end is configured to slide relative to the housing, and the second connection end is fixed relative to the housing;
the housing has a first end configured to be connected to the peer adapter in a pluggable manner;
when the first end of the housing is not connected to the peer adapter, the first connection end is closer to the first end compared with the second connection end; and
when the first end of the housing is connected to the peer adapter, the second connection end is closer to the first end compared with the first connection end.

5. The opto-electronic adapter according to claim 4, wherein the electrical connector is fixedly connected to the housing.

6. The opto-electronic adapter according to claim 4, wherein the optical connector comprises a ferrule, a first elastic component, and a ferrule holder that are arranged along the first direction; one end that is of the ferrule and that is away from the ferrule holder is the first connection end; the ferrule holder is fixedly connected to the housing; the ferrule is slidably connected to the ferrule holder and is configured to slide along the first direction; and the first elastic component is configured to push the ferrule to slide along a direction away from the ferrule holder.

7. The opto-electronic adapter according to claim 6, wherein the opto-electronic adapter further comprises a limiting protrusion configured to limit a sliding distance of the ferrule along a direction away from the ferrule holder is disposed in the housing.

8. The opto-electronic adapter according to claim 4, wherein the opto-electronic adapter further comprises a dust-proof component configured to shield the first connection end; and
the dust-proof component is rotatably connected to the housing, and avoids the peer adapter when the peer adapter is plugged into the housing.

9. The opto-electronic adapter according to claim 8, wherein the opto-electronic adapter further comprises a guide structure configured to guide the peer adapter to fit with and be plugged into the housing is disposed in the housing, and the guide structure is located on a side that is of the dust-proof component and that is away from the first connection end.

10. The opto-electronic adapter according to claim 8, wherein the dust-proof component comprises a first dust-proof plate and a second dust-proof plate;
when the first dust-proof plate and the second dust-proof plate rotate to a first specified position, the first dust-proof plate and the second dust-proof plate shield the first connection end; and
when the first dust-proof plate and the second dust-proof plate rotate to a second specified position which is different from the first specified position, the first dust-proof plate and the second dust-proof plate avoid the peer adapter.

11. The opto-electronic adapter according to claim 10, wherein when the first dust-proof plate and the second dust-proof plate rotate to the first specified position, the first dust-proof plate and the second dust-proof plate are of a V-shaped structure, and an opening direction of the V-shaped structure is away from the first connection end.

12. The opto-electronic adapter according to claim 8, wherein the dust-proof component comprises a dust-proof plate;
when the dust-proof plate rotates to a specified position, the dust-proof plate shields the first connection end; and
when the dust-proof plate rotates to a another specified position which is different from the specified position, the dust-proof plate avoids the peer adapter.

13. The opto-electronic adapter according to claim 1, wherein the electrical connector further comprises a third connection end, and the third connection end is configured to be electrically connected to a circuit board.

14. The opto-electronic adapter according to claim 13, wherein the third connection end comprises a plurality of fisheye pins, and the plurality of fisheye pins are configured to be press fit with the circuit board.

15. The opto-electronic adapter according to claim 13, wherein the third connection end comprises a plurality of adapter terminals, and the plurality of adapter terminals are configured to be welded to the circuit board.

16. A communication system comprising: a first electrical component and a second electrical component, wherein
the first electrical component comprises a circuit board and a first opto-electronic adapter that is disposed on the circuit board, wherein the first opto-electronic adapter comprises an optical connector and an electrical connector that are stacked, wherein
the optical connector has a first connection end configured to fit with a peer adapter, and the electrical connector has a second connection end configured to fit with the peer adapter;
the first connection end and the second connection end have a same opening direction; and
the first connection end is configured to slide along a first direction relative to the second connection end, the first direction is a plugging direction of the peer adapter, and the first connection end is configured to be connected to the peer adapter before the second connection end; and
the second electrical component comprises a second opto-electronic adapter, and the second opto-electronic adapter is a peer adapter that is connected to the first opto-electronic adapter in a pluggable manner.

17. The communication system according to claim 16, wherein the first connection end is further configured to be disconnected from the peer adapter after the second connection end.

18. The communication system according to claim 16, wherein when the first connection end is connected to the peer adapter, a sliding distance of the first connection end relative to the second connection end is d1, a fitting distance of the second connection end to be plugged into the peer adapter is d2, and d1 and d2 satisfy d1>d2.

19. The communication system according to claim 16, wherein the opto-electronic adapter further comprises a housing, the optical connector and the electrical connector are located in the housing, the first connection end is configured to slide relative to the housing, and the second connection end is fixed relative to the housing;
- the housing has a first end configured to be connected to the peer adapter in a pluggable manner;
- when the first end of the housing is not connected to the peer adapter, the first connection end is closer to the first end compared with the second connection end; and
- when the first end of the housing is connected to the peer adapter, the second connection end is closer to the first end compared with the first connection end.

20. The communication system according to claim 19, wherein the electrical connector is fixedly connected to the housing.

* * * * *